US012719299B2

(12) United States Patent
Huang et al.

(10) Patent No.: US 12,719,299 B2
(45) Date of Patent: Aug. 25, 2026

(54) POWER SUPPLY CIRCUIT

(71) Applicant: Chengdu Monolithic Power Systems Co., Ltd., Chengdu (CN)

(72) Inventors: Kai Huang, Chengdu (CN); Lei Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 668 days.

(21) Appl. No.: 18/338,065

(22) Filed: Jun. 20, 2023

(65) Prior Publication Data

US 2023/0420975 A1 Dec. 28, 2023

(30) Foreign Application Priority Data

Jun. 22, 2022 (CN) ......................... 202210714563.1

(51) Int. Cl.

*H02J 7/96* (2026.01)
*H02J 7/00* (2026.01)
*H02J 7/80* (2026.01)
*H02J 9/06* (2006.01)

(52) U.S. Cl.

CPC *H02J 7/96* (2026.01); *H02J 7/80* (2026.01); *H02J 7/855* (2026.01); *H02J 9/061* (2013.01)

(58) Field of Classification Search

CPC ........ H02J 7/96; H02J 7/80; H02J 7/40; H02J 7/855; H02J 7/00; H02J 7/345; H02J 7/02; H02J 9/061; H02J 9/06; H02J 9/062; H02J 1/102; H02J 2105/425

See application file for complete search history.

(56) References Cited

FOREIGN PATENT DOCUMENTS

| | | | | |
|---|---|---|---|---|
| CN | 105741871 A | * | 7/2016 | ............. G11C 16/06 |
| CN | 105741871 A1 | | 7/2016 | |

* cited by examiner

*Primary Examiner* — David V Henze

(74) *Attorney, Agent, or Firm* — Ashurst Perkins Coie US LLP

(57) ABSTRACT

A power supply circuit that may be operated in a pre-charge mode or a switch-charge mode to provide a charging current. In the pre-charge mode, a current sense transistor of the power supply circuit may be operating to sense the charging current and to provide a current sense signal indicative of the charging current, while a current control transistor of the power supply circuit may be operating to control the charging current based on the current sense signal.

29 Claims, 6 Drawing Sheets

POWER SUPPLY CIRCUIT

CROSS-REFERENCE TO RELATED APPLICATIONS

This application claims the benefit of CN application No. 202210714563.1 filed on Jun. 22, 2022 and incorporated herein by reference.

TECHNICAL FIELD

The present invention relates to the field of electronic circuits, and particularly to a power supply circuit.

BACKGROUND OF THE INVENTION

Power supply circuits are widely used in power supply system where uninterrupted power supply is required because a storage capacitor can provide backup power to other circuits in the system when the external input voltage is powered down. When the external input voltage is in a normal state, the external input voltage supplies power to the power supply circuit and other circuits in the system, and when the external input voltage is powered down, the power supply circuit outputs a supply voltage to power other circuits in the system, so that other circuits in the system can get enough power to save data or perform other operations.

Generally, when the external input voltage is in a normal state, the power supply circuit converts the input voltage to a higher voltage and stores it in the storage capacitor, that is, charging the storage capacitor. In order to meet the requirements of overall power supply of the system and the needs of the application, when charging the storage capacitor, the charging current is required to be accurately sensed and controlled.

Therefore, a power supply circuit which can accurately sense and control the charging current is needed.

SUMMARY OF THE INVENTION

Embodiments of the present invention are directed to power supply circuit. The power supply circuit may include a bus terminal coupled to a power supply input terminal, a switch circuit having at least one switch coupled between a bias terminal and a reference ground. The power supply circuit may further include a current sense circuit having a current sense transistor and a current control circuit having a current control transistor. The current sense circuit may be coupled between the bus terminal and the bias terminal. The current control circuit may be coupled between the bias terminal and a storage terminal.

Embodiments of the present invention are directed to power supply circuit. The power supply circuit may include a bus terminal configured as an output terminal for providing a bus voltage, a storage terminal configured as an output terminal for providing a charging current, and a bias terminal. The power supply circuit may further include a switch circuit having at least one switch, a current control circuit having a current control transistor and a current sense circuit having a current sense transistor. The switch circuit may be coupled between the bias terminal and a reference ground. The current control circuit may be coupled between the bias terminal and the storage terminal. The current sense circuit may be coupled between the bus terminal and the bias terminal.

BRIEF DESCRIPTION OF DRAWINGS

For a better understanding of the invention, embodiments of the invention will be described in accordance with the following drawings, which are used for illustrative purpose only. The drawings illustrate only some of the features in an embodiment. It should be understood that the drawings are not necessarily to scale. Like elements are provided with like reference numerals in different appended drawings.

DETAILED DESCRIPTION OF THE INVENTION

Detailed description of the embodiments is provided merely to give examples and not intended to be limiting. Plenty of details are provided to assist the reader in gaining a comprehensive understanding of the present invention. However, many other ways of implementing the disclosure of this application described herein will be apparent. Description of circuits, materials and methods that are known in the art may not be addressed in this disclosure for simplicity.

Throughout the specification and claims, the term "coupled" as used herein, is defined as directly or indirectly connected in an electrical or non-electrical manner. The articles "a," "an," and "the" are intended to include the plural forms as well, unless the context clearly indicates otherwise. These phases "one embodiment", "an embodiment", "an example" and "examples" are not necessarily directed to the same embodiment or example. Furthermore, the features, structures, or characteristics may be combined in one or more embodiments or examples.

Throughout the specification and claims, the term "linear region" as used herein, refers to an operation region of a transistor in which a current flowing from a drain to a source of the transistor is a linear function of a drain to source voltage (a voltage between the drain and the source of the transistor). Throughout the specification and claims, the term "saturation region" as used herein, refers to an operation region of a transistor in which the current flowing from the drain to the source of the transistor is substantially constant.

Figure 1:
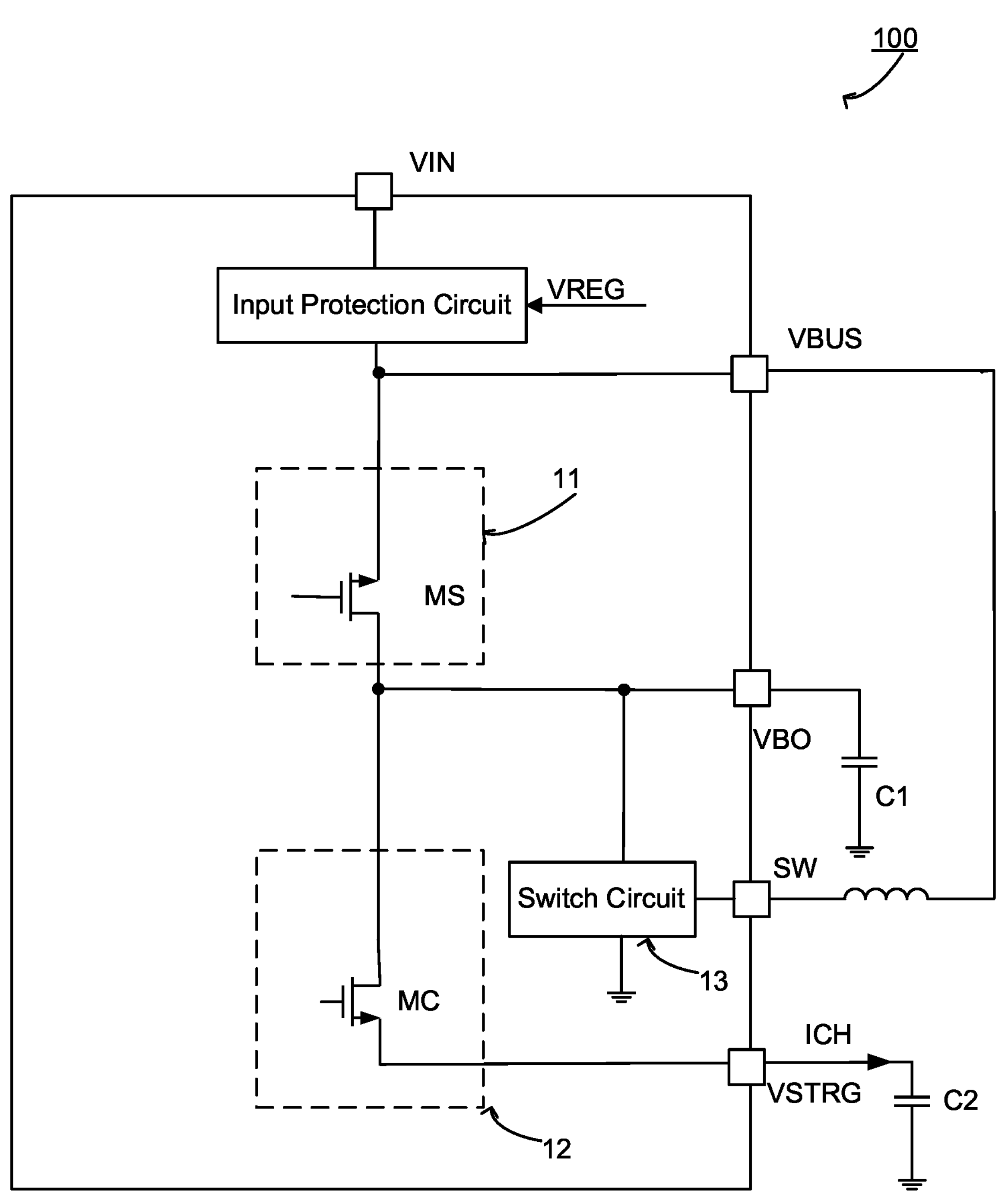
FIG. 1 illustrates a schematic diagram of a power supply circuit 100 in accordance with an embodiment of the present invention.

FIG. 1 schematically illustrates a power supply circuit 100 in accordance with an embodiment of the present invention. In an example, the power supply circuit 100 may include a bi-directional converter. The power supply circuit 100 may have a bus terminal coupled to a power supply input terminal, a storage terminal and a bias terminal. The power supply circuit 100 may further include a current sense circuit 11 coupled between the bus terminal and the bias terminal and a current control circuit 12 coupled between the bias terminal and the storage terminal. The current sense circuit 11 may include a current sense transistor MS and the current control circuit 12 may include a current control transistor MC. When the power supply circuit 100 operates in a charging mode which may include a pre-charge mode and a switch-charge mode, the bus voltage VBUS may be converted to charge a storage capacitor C2. The power supply circuit 100 may further include a switch circuit 13 having at least one switch. In an example, the switch circuit 13 may include a first controllable switch and a second controllable switch for instance implemented by field effect transistors. The first controllable switch and the second controllable switch may be coupled in series between the bias terminal VBO and the reference ground and may have a common connection terminal SW.

When the storage voltage VSTRG is below the bus voltage VBUS, and the voltage difference between the storage voltage VSTRG and the bus voltage VBUS is greater than a reference threshold voltage Vth, the power supply circuit 100 may work in the pre-charge mode. In an embodiment, in the pre-charge mode, both the current sense transistor MS and the current control transistor MC may operate/may be operating while the at least one switch of the switch circuit 13 may be turned off. Throughout the present disclosure, a transistor operates or being operating refers to a state that the transistor is not fully turned off, for instance, the transistor may be operating either in a linear region or in a saturation region of the transistor, in other words, a state that there is a current flowing from a drain to a source of the transistor. Throughout the present disclosure, a transistor being turned off refers to a state that the transistor is equivalent to a turned-off switch, in other words, a state that there is no current flowing through the transistor. In an example, in the pre-charge mode, the current sense transistor MS may operate in a linear region of the current sense transistor MS, the current control transistor MC may operate in a saturation region of the current control transistor MC. The power supply circuit 100 operating in the pre-charge mode may provide the charging current ICH from the bus terminal VBUS to the storage terminal VSTRG at least through the current control transistor MC. In an embodiment, the power supply circuit 100 operating in the pre-charge mode may provide the charging current ICH through the current sense transistor MS and the current control transistor MC to the storage terminal VSTRG. That is to say, the charging current ICH may flow through the current sense transistor MS and the current control transistor MC to the storage terminal. When the storage voltage VSTRG is below the bus voltage VBUS, and the voltage difference between the storage voltage VSTRG and the bus voltage VBUS is smaller than the reference threshold voltage Vth, or when the storage voltage VSTRG is above the bus voltage VBUS, the power supply circuit 100 may work in the switch-charge mode. While in the switch-charge mode, the current sense transistor MS is turned off, the current control transistor MC operates and the switch circuit controls the at least one switch of the switch circuit 13 to switch on and off. In an example, in the switch-charge mode, the current sense transistor MS may be turned off and the current control transistor MC may operate in a linear region of the current control transistor MC. The switch-charge mode may include a first mode and a second mode. When the storage voltage VSTRG is below the bus voltage VBUS, and the voltage difference between the storage voltage VSTRG and the bus voltage VBUS is smaller than the reference threshold voltage Vth, the power supply circuit 100 may work in the first mode, while when the storage voltage VSTRG is above the bus voltage VBUS, the power supply circuit 100 may work in the second mode. In one embodiment of the present invention, the reference threshold voltage Vth may be in the range of 200 mV to 400 mV.

In accordance with the embodiment of FIG. 1, the switch circuit 13 may be coupled between the bias terminal and the reference ground. While in the pre-charge mode, no current flows through the switch circuit 13, the charging current ICH flows from the bus terminal to the storage terminal through the current sense transistor MS and the current control transistor MC and generates the bias voltage VBO at the bias terminal, wherein the bias voltage VBO is lower than the bus voltage VBS during the pre-charge mode. In one embodiment of the present invention, the switch circuit 13 may include at least one switch MH, which is turned off while in the pre-charge mode. In an exemplary embodiment, the switch circuit 13 may include at least one switch MH and may be adapted to be configured to constitute at least part of a bi-directional converter which may be able to operate as a boost converter or a buck converter. When the storage voltage VSTRG is below the bus voltage VBUS, and the voltage difference between the storage voltage VSTRG and the bus voltage VBUS is smaller than the reference threshold voltage Vth, the pre-charge mode is terminated and the power supply circuit 100 works in the switch-charge mode. While in the switch mode, the charging current ICH flows to the storage terminal through the switch circuit 13 and the current control transistor MC. In one embodiment of the present invention, the switch circuit 13 may include at least one switch MH, which is controlled to be turned on and off while in the switch-charge mode to provide the charging current ICH and to convert the bus voltage VBUS to the bias voltage VBO.

Figure 2:
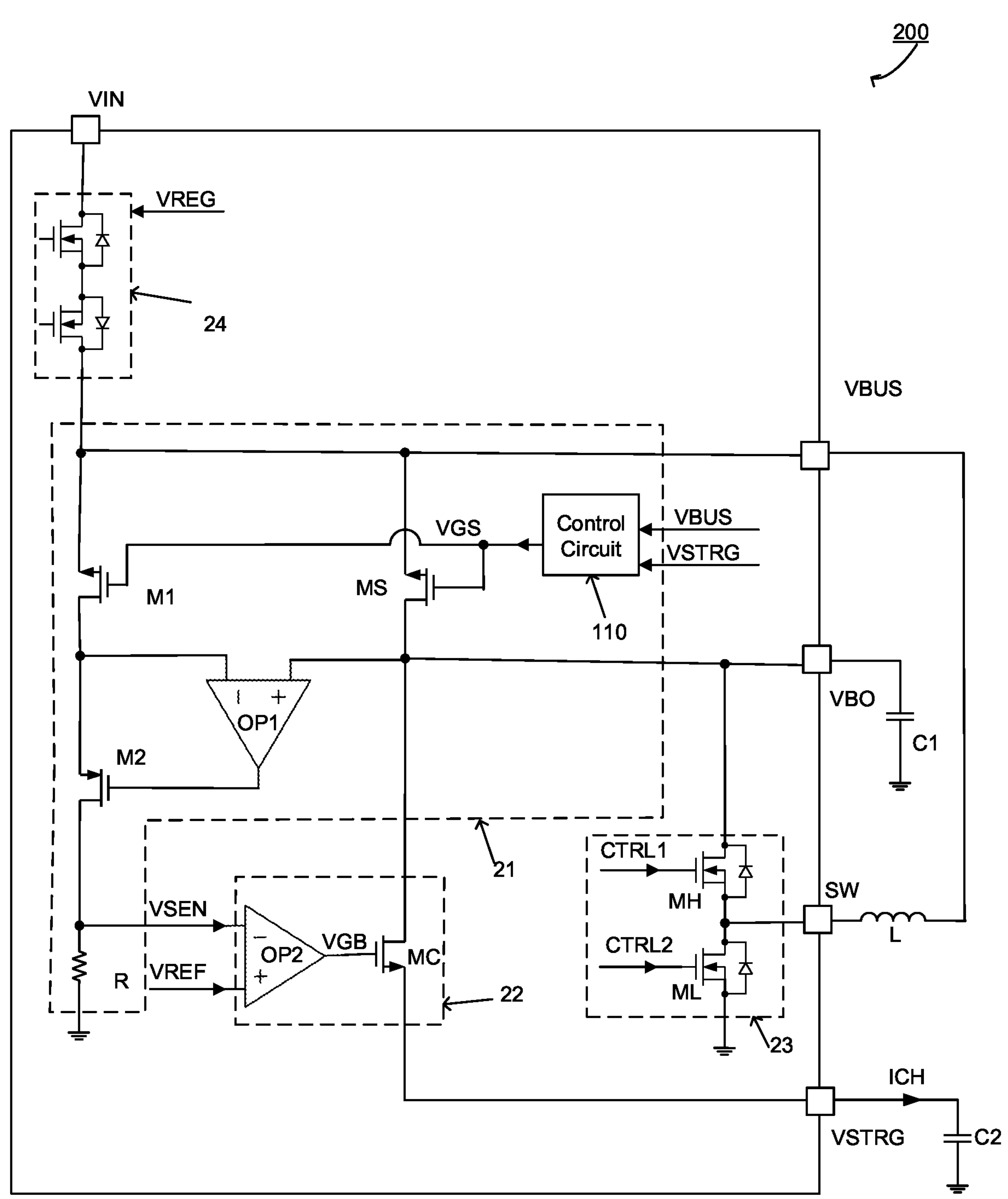
FIG. 2 illustrates a schematic diagram of a power supply circuit 200 in accordance with an embodiment of the present invention.

FIG. 2 schematically illustrates a power supply circuit 200 in accordance with an embodiment of the present invention. In the embodiment of FIG. 2, besides the current sense transistor MS, the current sense circuit 11 may further include a first transistor M1, a second transistor M2, a first operational amplifier OP1, a resistor R and a control circuit 110. The current sense transistor MS may include a source terminal coupled to the bus terminal, a drain terminal coupled to the bias terminal and a gate terminal configured to receive a gate control signal VGS provided by the control circuit 110. By comparing the storage voltage VSTRG and the bus voltage VBUS, the control circuit 110 generates the gate control signal VGS to control the current sense transistor MS on and off. When the storage voltage VSTRG is below the bus voltage VBUS, and the voltage difference between the storage voltage VSTRG and the bus voltage VBUS is greater than the reference threshold voltage Vth, the current sense transistor MS is turned on controlled by the gate control signal VGS. When the storage voltage VSTRG is below the bus voltage VBUS, and the voltage difference between the storage voltage VSTRG and the bus voltage VBUS is smaller than the reference threshold voltage Vth, or when the storage voltage VSTRG is above the bus voltage VBUS, the current sense transistor MS is turned off controlled by the gate control signal VGS. In the embodiment of FIG. 2, the first transistor M1 may include a source terminal coupled to the source terminal of the current sense transistor MS, a gate terminal coupled to the gate terminal of the current sense transistor MS, a drain terminal coupled to a first input terminal of the first operational amplifier OP1.

The second transistor M2 may include a source terminal coupled to the drain terminal of the first transistor M1 and a gate terminal coupled to an output terminal of the first operational amplifier OP1. A second input terminal of the operational amplifier OP1 may be coupled to the drain terminal of the current sense transistor MS. The resistor R is coupled between a drain terminal of the second transistor M2 and the reference ground to provide a current sense signal VSEN indicative of the charging current ICH.

In the embodiment of FIG. 2, besides the current control transistor MC, the current control circuit 22 may further include a second operational amplifier OP2. The current control transistor MC may include a source terminal coupled to storage terminal, a drain terminal coupled to the bias terminal, and a gate terminal configured to receive a current control signal VGB provided by the second operational amplifier OP2. By comparing the current sense signal VSEN received at a first input terminal of the second operational amplifier OP2 and a reference voltage VREF received at a second input terminal of the second operational amplifier OP2, the second operational amplifier OP2 generates the current control signal VGB to control the charging current ICH flowing through the current control transistor MC to a preset value. The second operational amplifier OP2 generates the current control signal VGB: when the charging current ICH increases, the current sense signal VSEN indicative of the charging current ICH increases, the current control signal VGB generated by the second operational amplifier OP2 decreases, thereby the voltage provided to the gate terminal of the current control transistor MC decreases and the charging current ICH decreases. It should be understood that the current sense circuit 11 and the current control circuit 22 may comprise any topology suitable to sense and control the charging current ICH.

In the embodiment of FIG. 2, the switch circuit 23 may include a high-side switch MH controlled by a driving signal CTRL1 and a low-side switch ML controlled by a driving signal CTRL2. An inductive device L is coupled between the bus terminal and a common connection terminal SW (i.e., a switch terminal) of the high-side switch MH and the low-side switch ML. While in the pre-charge mode, both the high-side switch MH and the low-side switch are turned off, no current flows through the inductive device L. While in the switch-charge mode, the current sense transistor MS is turned off, the charging current ICH flows to the storage terminal through the switch circuit 23 and the current control transistor MC. While in the switch-charge mode, the high-side switch MH and the low-side switch ML of the switch circuit 23 are controlled on or off to provide the charging current ICH and to convert the bus voltage VBUS to the bias voltage VBO. While in the switch-charge mode, the charging current ICH may be a current or an average current flowing through the inductive device L. In one embodiment of the present invention, the charging current ICH of the switch-charge mode is larger than that of the pre-charge mode. In one embodiment of the present invention, while in the switch-charge mode, a current flowing through the low-side switch is detected and used to control the charging current ICH. In one embodiment, when the storage voltage VSTRG is below the bus voltage VBUS, and the voltage difference between the storage voltage VSTRG and the bus voltage VBUS is smaller than the reference threshold voltage Vth, the power supply circuit 100 may work in the first mode, while in the first mode, the high-side switch MH may be turned off, the low-side switch and a body diode of the high-side switch MH enable the switch circuit 13 to work as a boost circuit. In other words, while in the first mode, the charging current may flow through the body diode of the high-side switch MH. In one embodiment of the present invention, the reference threshold voltage Vth may be set based on parameters of the body diode of the high-side switch MH, for instance, the reference threshold voltage Vth may be set to be no higher than a forward conduction voltage drop of the body diode of the at least one switch of the switch circuit 13. To provide an example, in one embodiment of the present invention, the reference threshold voltage Vth may be in the range of 200 mV to 400 mV.

In the embodiment of FIG. 2, the power supply circuit 200 may further include an input protection circuit 24. The input protection circuit 24 may be configured to receive an input voltage VIN and to generate the bus voltage VBUS based on the input voltage VIN. In one embodiment of the present invention, when the input voltage VIN is large than a protection threshold voltage VREG, the bus voltage VBUS provided by the input protection circuit 24 equals to the protection threshold voltage VREG. When the input voltage VIN is not larger than the protection threshold voltage VREG, the bus voltage VBUS provided by the input protection circuit 24 equals to input voltage VIN. In one embodiment of the present invention, the input protection circuit 24 may be further configured to detect a monitoring current flowing through it and disconnect the bus terminal from the input voltage VIN when the monitoring current arises above a threshold value.

Figure 3:
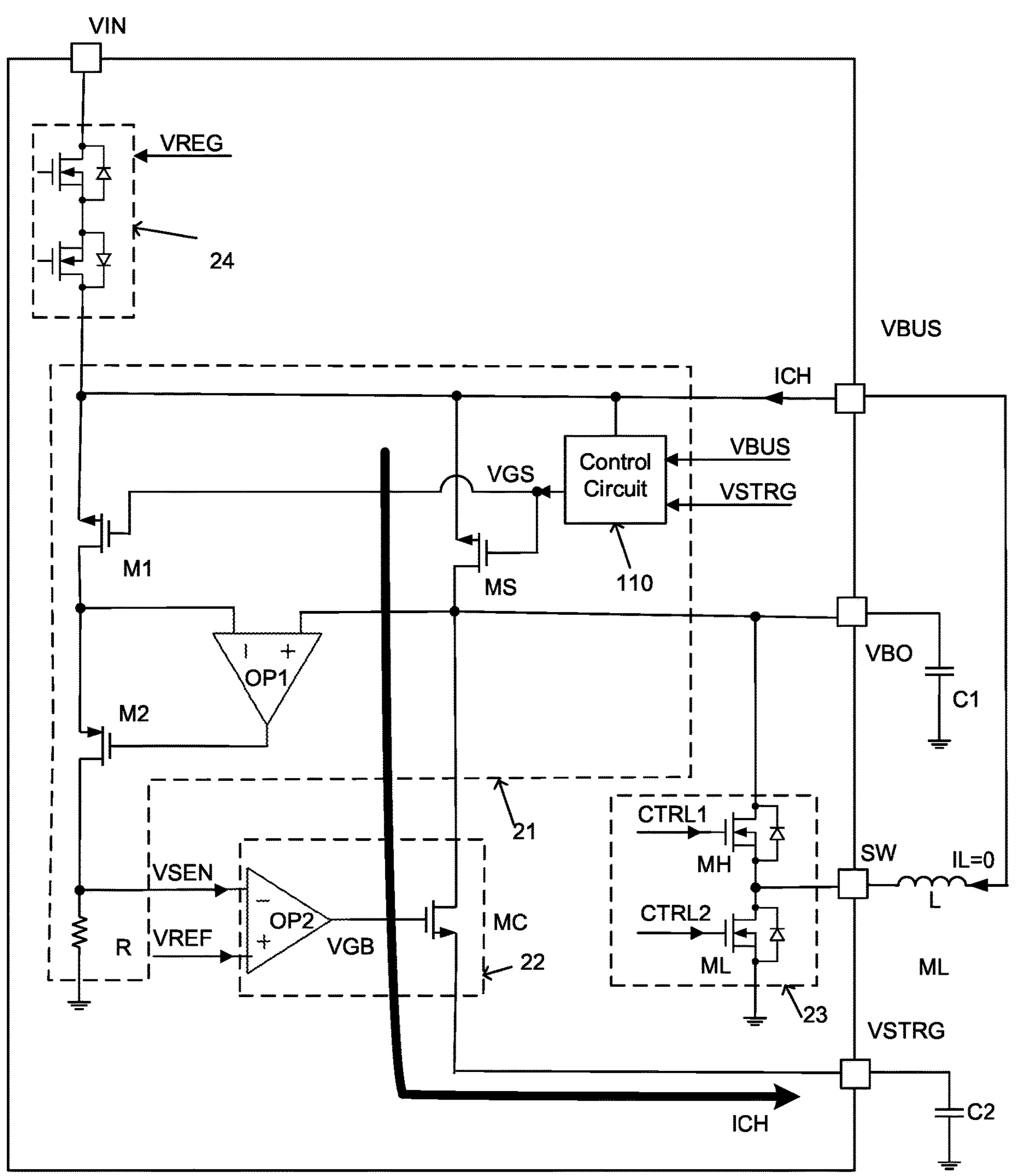
FIG. 3 illustrates the power supply circuit 200 operating in a pre-charge mode in accordance with an embodiment of the present invention, the direction of the arrow in this figure shows a path through which a charging current ICH flows when the power supply circuit 200 works in the pre-charge mode.

FIG. 3 schematically illustrates the power supply circuit 200 in accordance with the embodiment of FIG. 2 operating in the pre-charge mode. The direction of the arrow in this figure shows a path through which the charging current ICH flows. As shown in FIG. 3, when the power supply circuit 200 operates in the pre-charge mode, the charging current ICH flows from the bus terminal to the storage terminal to charge the storage capacitor C2 through the current sense transistor MS and the current control transistor MC, while no current flows through the inductive device L or the switch circuit 23. In the pre-charge mode, the storage voltage VSTRG increases in a linearly arising ramp having an arising rate decided by the charging current ICH.

Figure 4:
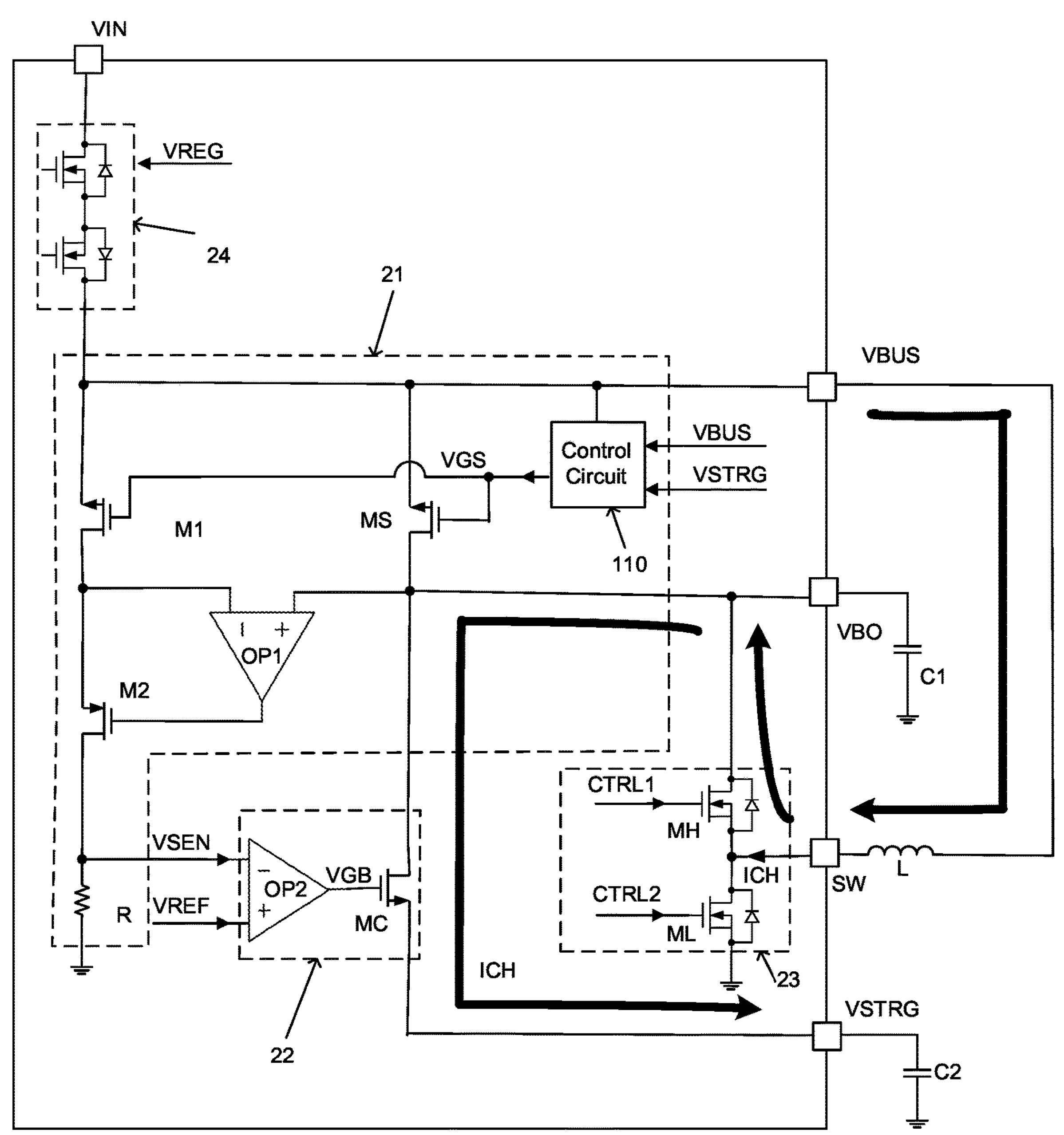
FIG. 4 illustrates the power supply circuit 200 operating in accordance with the embodiment of the present invention, the direction of the arrow in this figure shows a path through which the charging current ICH flows when the supply circuit 200 works in a switch-charge mode.

FIG. 4 schematically illustrates the power supply circuit 200 in accordance with the embodiment of FIG. 2 operating in the switch-charge mode. The direction of the arrow in this figure shows a path through which the charging current ICH flows. As shown in FIG. 4, when the power supply circuit 200 operates in the switch-charge mode, the charging current ICH flows from the bus terminal to the storage terminal to charge the storage capacitor C2 through the inductive device L, the switch circuit 23 and the current control transistor MC, while no current flows through the current sense transistor MS since the current sense transistor MS is turned off during this mode. In the switch-charge mode, the storage voltage VSTRG increases to a preset voltage VSET.

Figure 5:
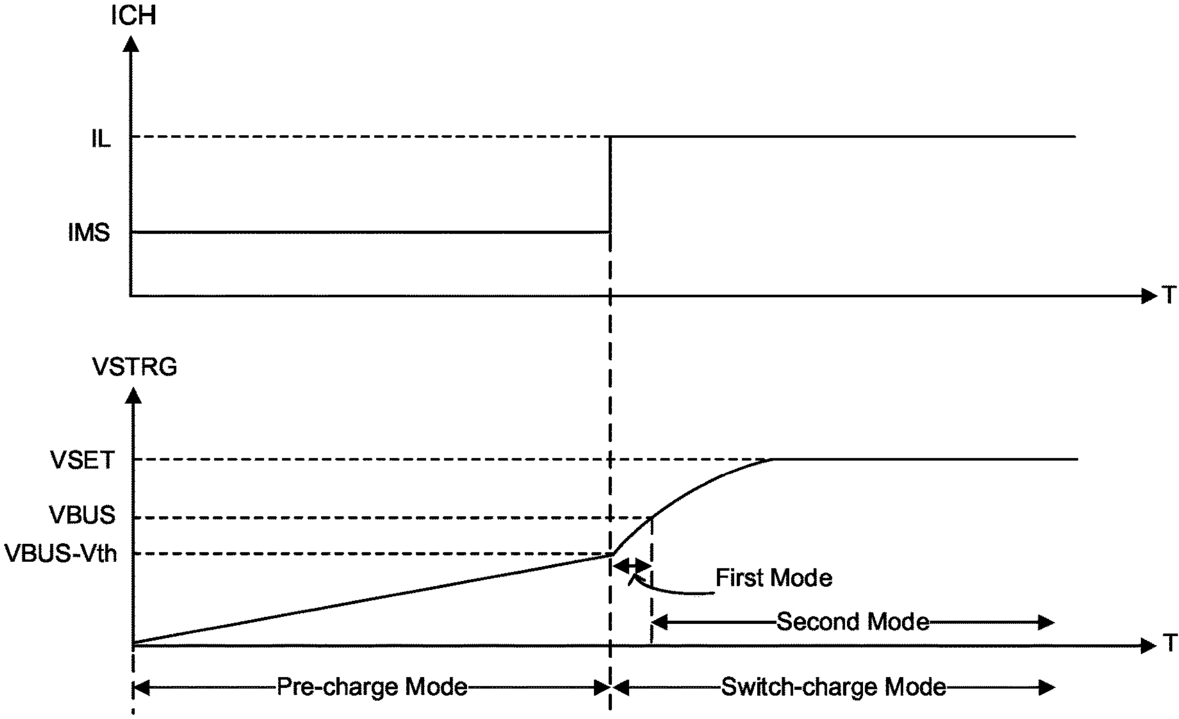
FIG. 5 is a waveform diagram showing waveforms of several signals including the charging current ICH and a storage voltage VSTRG in the power supply circuits according to the embodiments of the present invention.

FIG. 5 schematically illustrates a waveform diagram showing waveforms of several signals in power supply circuit according to the embodiment of FIG. 2. As shown in FIG. 5, when the storage voltage VSTRG is below the bus voltage VBUS, and the voltage difference between the storage voltage VSTRG and the bus voltage VBUS is greater than the reference threshold voltage Vth, the power supply circuit 200 operates in the pre-charge mode, the charging current ICH equals to the current flowing through the current sense transistor MS, while no current flows through the inductive device L. The storage voltage VSTRG increases in a linearly arising ramp. When the storage voltage VSTRG is below the bus voltage VBUS, and the voltage difference between the storage voltage VSTRG and the bus voltage VBUS is smaller than the reference threshold voltage Vth, the power supply circuit 200 operates in the first mode of the switch-charge mode. When the storage voltage VSTRG is above the bus voltage VBUS, the power supply circuit 200 operates in the second mode of the switch-charge mode. During switch-charge mode, the charging current ICH equals to the average current flowing through the inductive device L while no current flows through the current sense transistor. The storage voltage VSTRG increases to the preset voltage VSET which is larger than the bus voltage VBUS.

Figure 6:
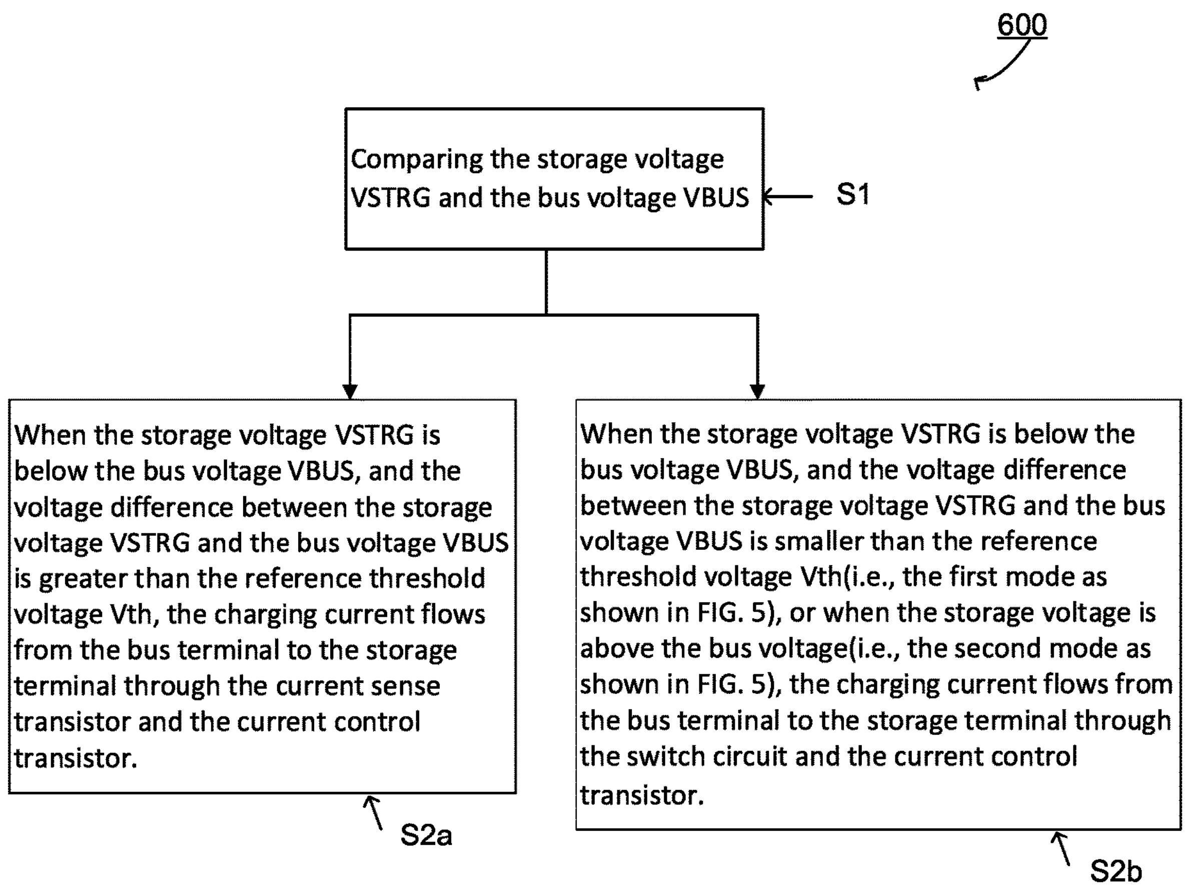
FIG. 6 shows a schematic flow diagram of a method 600 for controlling a charging current ICH in a power supply circuit according to an embodiment of the present invention.

FIG. 6 shows a schematic flow diagram of a method 600 for sensing and controlling the charging current ICH in the power supply circuit according to an embodiment of the present invention. For ease of understanding, steps of the method 600 is described here taking the power supply circuit 200 of FIG. 2 as an example. The power supply circuit 200 includes the bus terminal configured to provide the bus voltage VBUS, the storage terminal configured to provide the charging current ICH to the storage capacitor C2 and the bias terminal configured to provide the bias voltage VBO. The power supply circuit 200 further includes the current sense transistor MS coupled between the bus terminal and the bias terminal, the current control transistor MC coupled between the bias terminal and the storage terminal and the switch circuit 23 coupled between the bias terminal and the reference ground. The method 600 may include a step S1 and a step S2. In step S1, the storage voltage VSTRG and the bus voltage VBUS may be compared. In step S2, the charging current ICH may be provided to the storage terminal through different paths based on the comparing result of the step S1: in a step S2*a* of the step S2, when the storage voltage VSTRG is below the bus voltage VBUS, and the voltage difference between the storage voltage VSTRG and the bus voltage VBUS is greater than the reference threshold voltage Vth, the charging current ICH flows from the bus terminal to the storage terminal to charge the storage capacitor C2 through the current sense transistor MS and the current control transistor MC; in a step S2*b* of the step S2, when the storage voltage VSTRG is below the bus voltage VBUS, and the voltage difference between the storage voltage VSTRG and the bus voltage VBUS is smaller than the reference threshold voltage Vth (i.e., the first mode as shown in FIG. 5), or when the storage voltage VSTRG is above the bus voltage VBUS (i.e., the second mode as shown in FIG. 5), the charging current ICH flows from the bus terminal to the storage terminal to charge the storage capacitor C2 through the inductive device L, the switch circuit 23 and the current control transistor MC. In one embodiment of the present invention, when the storage voltage VSTRG is below the bus voltage VBUS, and the voltage difference between the storage voltage VSTRG and the bus voltage VBUS is greater than the reference threshold voltage Vth, the current sense transistor MS may operate in the linear region of the current sense transistor MS and the current control transistor MC may operate in the saturation region of the current control transistor MC. In one embodiment of the present invention, when the storage voltage VSTRG is below the bus voltage VBUS, and the voltage difference between the storage voltage VSTRG and the bus voltage VBUS is smaller than the reference threshold voltage Vth (i.e., the first mode as shown in FIG. 5), or when the storage voltage VSTRG is above the bus voltage VBUS (i.e., the second mode as shown in FIG. 5), the current sense transistor MS may be turned off and the current control transistor MC may operate in the linear region of the current control transistor MC.

By using the power supply circuit disclosed in the present invention, while in the pre-charge mode, the current sense transistor MS may be configured to operate in the linear region of the current sense transistor MS to sense the charging current ICH and to provide the current sense signal VSEN indicative of the charging current ICH, while the current control transistor MC may be configured to operate in the saturation region of the current control transistor MC to control the charging current ICH based on the current sense signal VSEN. Since the current sense transistor MS operates in the linear region, it is insensitive to process, temperature, etc. Thereby the charging current ICH in the pre-charge mode can be accurately sensed and controlled.

It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

The invention claimed is:

1. A power supply circuit, comprising:

a bus terminal, coupled to a power supply input terminal;

a switch circuit having at least one switch, coupled between a bias terminal and a reference ground;

a current sense circuit having a current sense transistor, coupled between the bus terminal and the bias terminal; and a current control circuit having a current control transistor, coupled between the bias terminal and a storage terminal.

2. The power supply circuit of claim 1, wherein the bus terminal is coupled to the power supply input terminal through an input protection circuit, and wherein the input protection circuit is configured to generate a bus voltage based on an input voltage received at the power supply input terminal.

3. The power supply circuit of claim 1, wherein a switch terminal of the switch circuit is coupled to the bus terminal through an inductive device.

4. The power supply circuit of claim 1, wherein the power supply circuit has a pre-charge mode to provide a charging current from the bus terminal to the storage terminal at least through the current control transistor.

5. The power supply circuit of claim 4, wherein in the pre-charge mode, the power supply circuit is configured to provide the charging current through the current sense transistor and the current control transistor to the storage terminal.

6. The power supply circuit of claim 4, wherein in the pre-charge mode, the at least one switch of the switch circuit is turned off.

7. The power supply circuit of claim 4, wherein in the pre-charge mode, the current sense transistor and the current control transistor are operating.

8. The power supply circuit of claim 4, wherein in the pre-charge mode, the current sense transistor operates in a linear region of the current sense transistor while the current control transistor operates in a saturation region of the current control transistor.

9. The power supply circuit of claim 4, wherein in the pre-charge mode, the current sense circuit is configured to sense the charging current flowing through the current sense transistor and to generate a current sense signal indicative of the charging current flowing through the current sense transistor.

10. The power supply circuit of claim 1, wherein in the pre-charge mode, the current control circuit is configured to control a charging current flowing through the current control transistor to a preset value based on a current sense signal indicative of the charging current flowing through the current sense transistor.

11. The power supply circuit of claim 1, wherein the current sense circuit further comprises:

a control circuit, wherein the control circuit is configured to generate a gate control signal based on a comparing result of a bus voltage at the bus terminal and a storage voltage at the storage terminal;

a first transistor having a source terminal, a drain terminal and a gate terminal, and wherein the source terminal of the first transistor is coupled to a source terminal of the current sense transistor and the gate terminal of the first transistor is coupled to a gate terminal of the current sense transistor to receive the gate control signal;

a first operational amplifier having a first input terminal, a second input terminal, and an output terminal, and wherein the first input terminal is coupled to the drain terminal of the first transistor, the second input terminal is coupled to a drain terminal of the current sense transistor;

a second transistor having a source terminal, a drain terminal and a gate terminal, and wherein the source terminal of the second transistor is coupled to the drain terminal of the first transistor, the gate terminal of the second transistor is coupled to the output terminal of the first operational amplifier; and a resistor, coupled between the drain terminal of the second transistor and the reference ground to provide a current sense signal.

12. The power supply circuit of claim 1, wherein the current control circuit further comprises a second operational amplifier having a first input terminal configured to receive a current sense signal, a second input terminal configured to receive a reference voltage, and an output terminal configured to generate a current control signal to control the current control transistor.

13. The power supply circuit of claim 1, wherein, when a storage voltage at the storage terminal is below a bus voltage at the bus terminal and a voltage difference between the storage voltage and the bus voltage is greater than a reference threshold voltage, the power supply circuit is configured to operate in a pre-charge mode.

14. The power supply circuit of claim 1, wherein, when a storage voltage at the storage terminal is below a bus voltage at the bus terminal and a voltage difference between the storage voltage and the bus voltage is decreased to reach a reference threshold voltage, the power supply circuit is configured to terminate a pre-charge mode.

15. The power supply circuit of claim 1, wherein the power supply circuit has a switch-charge mode to provide a charging current through the switch circuit to the storage terminal.

16. The power supply circuit of claim 15, wherein in the switch-charge mode, the current sense transistor is turned off.

17. The power supply circuit of claim 15, wherein in the switch-charge mode, the current control transistor is operating.

18. The power supply circuit of claim 15, wherein in the switch-charge mode, the current control transistor operates in a linear region of the current control transistor.

19. The power supply circuit of claim 1, wherein, when a storage voltage at the storage terminal is below a bus voltage at the bus terminal and a voltage difference between the storage voltage and the bus voltage is decreased to reach a reference threshold voltage, the power supply circuit is configured to enter into a switch-charge mode.

20. The power supply circuit of claim 19, wherein the reference threshold voltage is set based on a forward conduction voltage drop of a body diode of the at least one switch of the switch circuit.

21. The power supply circuit of claim 19, wherein the reference threshold voltage ranges from 200 mV to 400 mV.

22. The power supply circuit of claim 1, wherein when a storage voltage at the storage terminal is higher than a bus voltage at the bus terminal, the power supply circuit is configured to operate in a switch-charge mode.

23. A power supply circuit, comprising:

a bus terminal, configured as an output terminal for providing a bus voltage;

a storage terminal, configured as an output terminal for providing a charging current;

a bias terminal;

a switch circuit having at least one switch, coupled between the bias terminal and a reference ground;

a current control circuit having a current control transistor, coupled between the bias terminal and the storage terminal; and a current sense circuit having a current sense transistor, coupled between the bus terminal and the bias terminal.

24. The power supply circuit of claim 23, wherein when a storage voltage at the storage terminal is below the bus voltage, and a voltage difference between the storage voltage and the bus voltage is greater than a reference threshold voltage, both the current sense transistor and the current control transistor operate while the at least one switch of the switch circuit is turned off.

25. The power supply circuit of claim 23, wherein when a storage voltage at the storage terminal is below the bus voltage, and a voltage difference between the storage voltage and the bus voltage is greater than a reference threshold voltage, a charging current flows from the bus terminal to the storage terminal through the current sense transistor and the current control transistor.

26. The power supply circuit of claim 23, wherein when a storage voltage at the storage terminal is below the bus voltage, and a voltage difference between the storage voltage and the bus voltage is smaller than a reference threshold voltage, the current sense transistor is turned off, the current control transistor operates and the switch circuit controls the at least one switch to switch on and off to provide a charging current to the storage terminal.

27. The power supply circuit of claim 23, wherein when a storage voltage at the storage terminal is above the bus voltage, the current sense transistor is turned off, the current control transistor operates and the switch circuit controls the at least one switch to switch on and off to provide a charging current to the storage terminal.

28. The power supply circuit of claim 23, wherein when a storage voltage at the storage terminal is below the bus voltage, and the voltage difference between the storage voltage and the bus voltage is smaller than a reference threshold voltage, a charging current flows from the bus terminal to the storage terminal through the switch circuit and the current control transistor.

29. The power supply circuit of claim 23, wherein when a storage voltage at the storage terminal is above the bus voltage, a charging current flows from the bus terminal to the storage terminal through the switch circuit and the current control transistor.

* * * * *